US011391704B2

(12) United States Patent
Bittner et al.

(10) Patent No.: US 11,391,704 B2
(45) Date of Patent: Jul. 19, 2022

(54) METHOD FOR EARLY DAMAGE RECOGNITION, AND PROGRAM AND CONTROL UNIT FOR EXECUTING THE METHOD

(71) Applicant: Robert Bosch GmbH, Stuttgart (DE)

(72) Inventors: Ulrich Bittner, Rottenburg A.N. (DE); Wilfried Eichner, Wildberg (DE)

(73) Assignee: Robert Bosch GmbH, Stuttgart (DE)

( * ) Notice: Subject to any disclaimer, the term of this patent is extended or adjusted under 35 U.S.C. 154(b) by 359 days.

(21) Appl. No.: 16/392,712

(22) Filed: Apr. 24, 2019

(65) Prior Publication Data

US 2020/0003736 A1 Jan. 2, 2020

(30) Foreign Application Priority Data

Jun. 27, 2018 (DE) .................... 10 2018 210 470.0

(51) Int. Cl.
*G01N 29/44* (2006.01)
(52) U.S. Cl.
CPC ....... *G01N 29/449* (2013.01); *G01N 29/4427* (2013.01)
(58) Field of Classification Search
CPC .................... G01N 29/449; G01N 29/4427
See application file for complete search history.

(56) References Cited

U.S. PATENT DOCUMENTS 8,744,637 B1 *   6/2014  Maragal ............. H02H 3/066
                                                     702/77
11,065,920 B2 *  7/2021  Kanbayashi .......... G01M 17/02
2017/0315516 A1  11/2017 Kozionov et al.

FOREIGN PATENT DOCUMENTS

DE       196 25 947 C1    9/1997
DE       199 50 222 A1    4/2001
DE    10 2008 035 954 A1  2/2010
DE    10 2010 005 049 A1  9/2010

OTHER PUBLICATIONS

German Search Report corresponding to DE 10 2018 210 470.0, dated Jan. 11, 2019 (German language document) (10 pages).
Tchernichovski, Ofer; Nottebohm, Fernando; HO, Ching Elizabeth; Pesaran, Bijan; and Mitra, Partha Pratim, Animal Behaviour, 2000, 59, The Association for the Study of Animal Behaviour, 12 pages.
EoI Analyser v2, product catalog, www.rhf.de, German and English language, 40 pages.

* cited by examiner

*Primary Examiner* — Bryan Bui
(74) *Attorney, Agent, or Firm* — Maginot, Moore & Beck LLP

(57) ABSTRACT

A method for early damage recognition of a machine, and program and control unit for executing the method are disclosed. The method is disclosed for early damage recognition, wherein a frequency-transformed signal, filtered of dominant excitations, is supplied to a comparative early damage recognition, and wherein, after the filtering, damage of the machine is recognized by comparing the signal to a comparison value.

15 Claims, 8 Drawing Sheets a)

b)

c)

d)

e)

f)

a)

b)

c)

d)

e)

f)

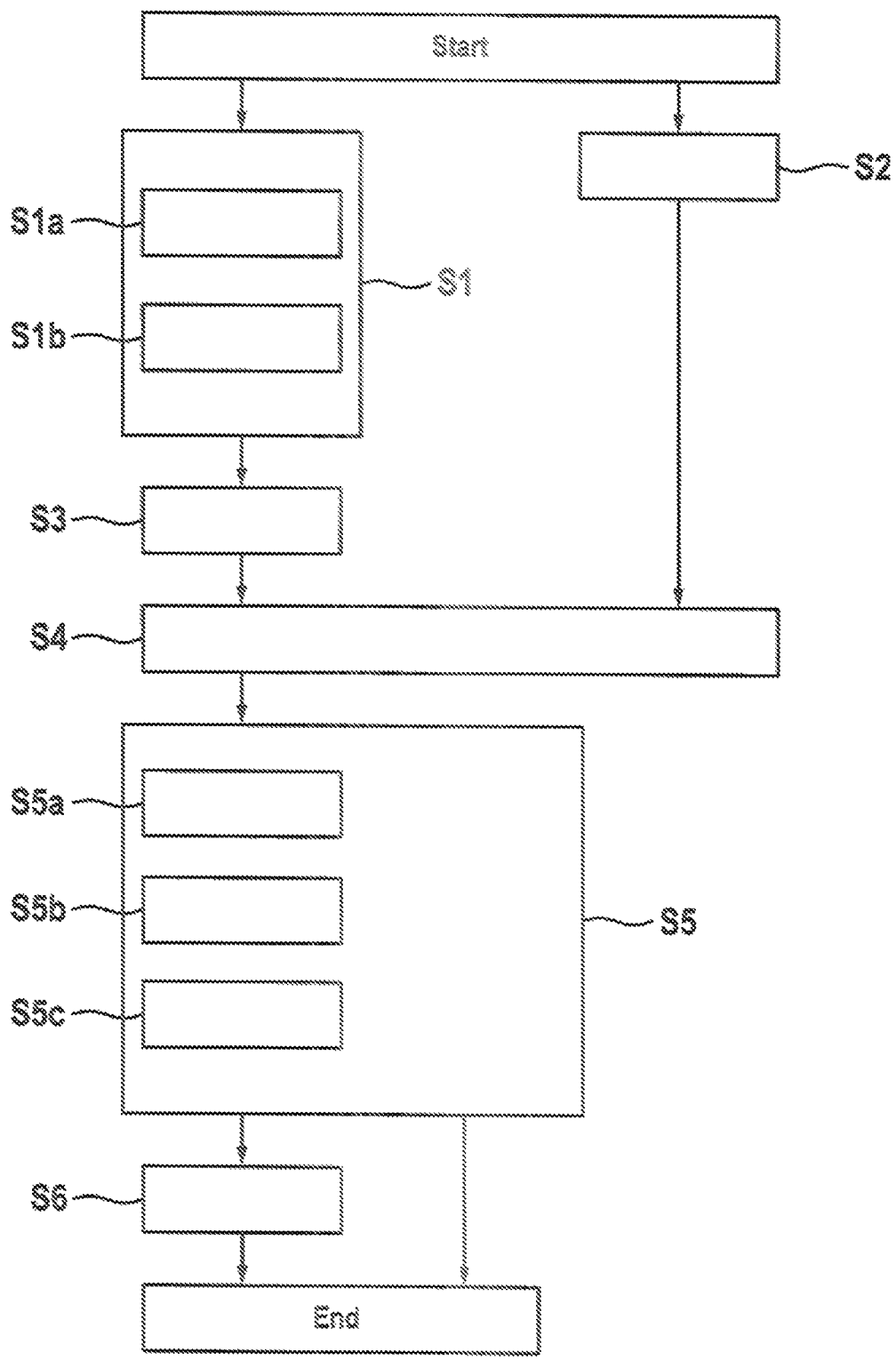

METHOD FOR EARLY DAMAGE RECOGNITION, AND PROGRAM AND CONTROL UNIT FOR EXECUTING THE METHOD

This application claims priority under 35 U.S.C. § 119 to application no. DE 10 2018 210 470.0, filed on Jun. 27, 2018 in Germany, the disclosure of which is incorporated herein by reference in its entirety.

TECHNICAL FIELD

The disclosure relates to a method for early damage recognition of a machine.

BACKGROUND

DE 196 25 947 C1 forms the closest prior art. It discloses a method for early malfunction recognition of a fluidic displacement machine. A pressure sensor arranged on the pressure side or output side outputs a pressure signal, which is supplied to a bandpass filter. The bandpass filter has at least one transmission range, which comprises pressure pulsations below the fundamental frequency formed by the offset stroke frequencies of the individual displacers in normal operation and/or between this fundamental frequency or one of its harmonics and the next-higher harmonic. A probe can be provided for determining the speed-dependent fundamental frequency in the case of strongly changing speeds. The filtered signal is displayed as a time curve or an error signal is generated as soon as the absolute value of the pressure variation or difference between maximum value of the pressure and minimum value of the pressure exceeds a threshold value.

The method according to DE 196 25 947 C1 is subject to restrictions. On the one hand, a working load is required to achieve the pressure pulsations, which is to be specified if necessary by means of a pressure-side throttle as proposed, so that the method is not usable in an energy-saving manner On the other hand, the method is based on pressure pulsations overlapping one another in normal operation or volume flow pulsations which are usually measurable in a complex and fuzzy manner, so that the application of the method is limited, on the one hand, to multiple displacer fluid machines and, on the other hand, to the detection of damage occurring on at least one component defining a working chamber (displacer, valve, seal, etc.). Finally, the measurement of pressure pulsations restricts the detection, on the one hand, to disturbances detectable in the pressure curve and, on the other hand, to the order or orders of magnitude of the pressure pulsation. Finally, the application of the known method is restricted to a few damage pictures.

DE 10 2008 035 954 A1 discloses a method for monitoring a displacement machine, wherein a system pressure is detected as a function of a displacer position and is compared to an expected system pressure curve dependent on the displacer position. Therefore, the observations made on DE 196 25 947 C1 apply accordingly.

A product catalog "eol ANALYSER v2", downloaded on 10 Nov. 2017 from www.rhf.de, shows, as a product advertisement, recording structure-borne noise by means of laser on shift transmissions or internal combustion engines, and identifying products having manufacturing defects from a frequency range by means of a self-learning algorithm.

The article "A procedure for an automated measurement of song similarity" by Ofer Tchernichovski et al., published in "Animal Behaviour, 2000, 59" describes determining the similarity of songs by sampling them (dividing them into parts) and Fourier transforming them, to then determine characteristic values to be compared. In this case, the problem of a dominating similarity in the frequency range is counteracted by processing intervals consisting of multiple samples or parts. In contrast to natural procedures, however, in technical procedures a disappearance of a dominating excitation with time is not to be expected.

DE 10 2010 005 049 A1 discloses a method for fault detection in hydraulic displacement machines, wherein at least one sum is formed in the frequency range over side bands, i.e., frequency bands in the immediate surroundings of a respective carrier frequency, of multiple selected frequencies, such as a piston frequency or integer multiples of the piston frequency.

SUMMARY

In contrast, it is the object of the present disclosure to make any arbitrary damage or even preliminary damage on a working machine, in particular a fluid machine, detectable. In this case, a suitability for series application, in particular in the fields of stationary fluid technology and/or mobile fluid technology, is preferred.

Preliminary damage can be a property change of a part or a device which does not yet represent a functional impairment but experience has shown will progress to a functional impairment. For example, pitting is frequently followed by a fracture.

This object is achieved according to the features of the disclosure. By transforming the signal into a frequency range upstream of the filtering step, on the one hand, digital signal processing is promoted because mathematical operations become simpler and the effort for this purpose becomes less. On the other hand, the amplitude-overlaid oscillation components in the time range are divided in the image range into individual frequencies (strictly speaking: into sampling frequency ranges), whereby they become differentiable. Individual damage mechanisms, for example, roller bearing damage, frequently do not have a direct influence on the dominating excitations of the machine to be monitored, so that the amplitudes thereof do not change. In particular early damage phases and/or preliminary damage can only be determined in an unreliable manner by signal values or characteristic values therefrom because of the dominance with respect to value of the dominant excitations. However, because the dominant excitations are reduced at least in absolute value, they no longer dominate the signal values/characteristic values. This also applies accordingly to an excitation and/or a signal value and/or a characteristic value and/or at least one signal.

The term "value", as in "signal value" and "comparison value", can be assigned a broad significance in this case. In addition to an actual value in the strict mathematical sense, for example, a combination and/or a pattern of features and/or values can also be suitable for monitoring.

In other words: By filtering out the dominating excitation amplitudes (technically speaking also orders of excitation) from the signal to be detected for state change, characteristic values can be extracted which detect even minor changes, for example, in frequency lines and/or bands occurring upon appearances of wear, which are already caused by early damage mechanisms. Using the method according to the disclosure, a recognition rate of the machine state, a damage diagnosis, and a remaining lifetime prediction can be improved. Because a transmission characteristic of the filtering is dependent on at least one operating parameter, such as a speed, a delivery pressure, a pivot angle, or similar variables, a false-positive recognition, i.e., a signal free of (preliminary) damage recognized as damage, can be avoided more reliably.

The method according to the disclosure and its refinements are particularly suitable for state monitoring (condition monitoring) of machines, for example, sound-emitting machines and/or, for example, at least also periodically excited machines. These machines comprise electric machines, internal combustion engines, mechanical machines, such as transmissions and/or roller bearings, fluid machines, in particular hydrostatic displacement machines in industrial and/or mobile applications, and/or hydrodynamic machines, such as fans, impellers, and the like, and/or combinations thereof and/or therewith.

Advantageous refinements of the disclosure are the subject matter of the embodiments.

Sound detection is preferred for the oscillation detection. Fluid-borne sound detection can be cost-effective if an existing pressure sensor is used. Airborne sound detection can be advantageous with respect to installation space and/or can avoid feedback from the sensor to the test subject. Structure-borne sound detection can be both robust and also non-damped. In addition, a rotational oscillation detection or a detection of electrical signals, in particular electrical oscillations, is preferred as the oscillation detection.

The term oscillation detection is not meant so strictly that the method is only applicable to a periodic oscillation or a superposition of only periodic oscillations, but rather singular events and a random or apparently random curve can also be included in the signal. The higher the proportion of the periodic elements in the overall signal, however, the better the signal can typically be processed, in particular in filters and/or in the recognition.

The oscillation detection can additionally include filtering in the time range. For this purpose, at least one (chronologically) synchronous and/or order-based bandstop filter can be used. A chronologically synchronous filtering can be a filtering relating to a fixed or variable period up to the present measurement signal. In this way, time-based features in the signal are detectable, for example, a mean value (such as period-related arithmetic, median, and/or root mean square value), a standard deviation, a vertex factor (crest value), a bulge (kurtosis), a skew (skewness), a breadth of variation (peak2peak and/or span) and/or the like and/or a combination thereof.

A fast Fourier transform is most preferred because of the low expenditure and the computer-processable, frequency-sorted image range. However, a discrete Fourier transform (the discrete Fourier transform is, for example, applying the "butterfly" algorithm prior to the fast Fourier transform), a Fourier transform in general, and/or one of the other integral transforms—Laplace transform, z transform (discrete correspondence to the Laplace transform) and/or Hilbert transform, also offer processing-specific advantages.

An operating variable can be detected once, for example, also only in a formula-based manner, or computed, for example, in stationarily operated machines. An irregular detection is advantageous in particular in the case of early damage recognition methods which are only executed irregularly and/or in the case of only irregular operation of the machine. In particular with computer-based method processing, in particular in dynamically operated machines or machines having frequently changing speed, periodic and/or continuous detections are advisable (online detection or real-time detection). A separate sensor signal can be detected as a refinement for this purpose. An analysis in the image range can result in the dominating excitation(s) additionally as a fine adjustment or alternatively. For example, an exact excitation location can be ascertainable from a harmonic, which is determinable more precisely with an equidistant frequency grid in the image range.

The spectrum can advantageously be scaled on the basis of at least one dominant excitation in an order spectrum. The location of the order can be determined by means of the at least one operating value as described above. In particular with a variable excitation location, the result is advantageous for sharpening if multiple chronologically successive signal sections are each first scaled with respect to order in a refining manner, and then the order-scaled sections are further processed as a total or average.

The location of the dominant excitation(s) and/or the order(s) can furthermore also be determined by a constructive variable, such as a number of displacers or number of blades in a hydrostatic or hydrodynamic machine, for example, a number of turns in an electric machine, for example, an ignition order in an internal combustion engine, for example, and/or the like. This concept is applicable to all machines having structurally related periodicity; a frequency inverter is also mentioned as an example. This concept is applicable in multiple ways to a machine having multiple structurally related different periodicities; a motor having variable transmission is mentioned as an example If multiple dominant excitations, such as different fundamental oscillations and/or a fundamental oscillation and the harmonics thereof and/or multiple harmonics, are to be filtered out, multiple simple filters can be used, and/or one complex filter can be used. It is usually more efficient to generate a complex filter and apply it at least once. Examples of applications having different fundamental oscillations include hydrostatic compact transmissions, for example, having a variable transmission ratio, comprising for example at least one motor and at least one pump, a machine unit, for example, comprising at least one hydraulic machine and at least one electric machine, and/or comprising, for example, at least one transmission and/or comprising, for example, at least one frequency inverter, for example, for a so-called E-axle.

The filtering can comprise at least one high-pass filter, low-pass filter, bandpass filter, or at least one bandstop filter. The filtering can comprise a submethod, wherein at least one dominant value, such as a value exceeding an absolute or relative limiting value with respect to absolute value, is replaced by at least one function-determined value, such as a mean value, in particular an RMS value, or by at least one extrapolated value, such as polynomial approximated values. Digital filtering can be efficient for this purpose.

Further filtering downstream at latest from the filtering reducing the dominant excitation(s), i.e., downstream from the filtering reducing the dominant excitation(s), integrated into the filtering reducing the dominant excitation(s), and/or further filtering upstream of the filtering reducing the dominant excitation(s), preferably the transformation, more preferably also the vibration detection, can advantageously be applied for the signal improvement. In this case, a low-pass filter improves the signal quality. While the filter reducing the dominant excitation(s) is preferably a digital filter, the further filter, in particular if it is upstream of the transformation and/or vibration detection, is preferably an analog filter.

A signal improvement with respect to the analysis capability is achievable by rectification, which is downstream at latest from filtering, i.e., downstream from the filtering or further filtering, integrated into the filtering or further filtering, and/or upstream from the filtering or further filtering, transforming, or vibration detection. Rectification is preferably upstream from the filtering, because the dominant excitation(s) is/are particularly well recognizable in the rectified signal. Rectification is also preferably downstream from the filter to qualitatively improve a following recognition step. An envelope curve of the signal is preferably output or relayed as a rectified signal. The envelope curve is determinable in various ways, for example, by means of an absolute value determination in the time range or image range, by means of a Hilbert transform as transforming into the image range, as a Hilbert filter applied in the image space, and/or as an even digital or analog FIR filter, which at least approximates a Hilbert filter.

An improvement of the signal, on the one hand, and a reduction of the computing effort, on the other hand, are achievable in that an allocation of the signal into at least two bands is upstream at latest from the recognition. One band can be, for example, an octave band, a third-octave band, a sixth-octave band, a twelfth-octave band, or the like. Furthermore, it is advantageous to cause the bands to become wider with increasing order. The widening can be determined logarithmically, as with octave-octave spectra or octave-third spectra, or according to a rule, such as a Fibonacci series or geometrical growth. The band division is advantageous in the image range both with a frequency spectrum and an order spectrum. For example, different damage mechanisms each have an effect on the signal application in at least one secondary band, so that by allocating the signal into at least two bands, for example, at least one additional pulse excitation, at least one velocity change such as a pressure buildup velocity change, and/or at least two non-correlated excitation arrangements can be recognized or detected more reliably. Compiling a spectrum to form frequency and/or order bands makes recognition using one of the following methods processable more efficiently.

The recognition is based on a comparison of a signal value to a comparison value. The recognition can include an amplitude modulation recognition and/or a frequency modulation recognition. For example, a signal value or a signal value sequence can be subtracted from a standard value or a standard value sequence. The recognition can include machine learning and/or be based thereon. The comparison value can include a pattern recognition method and/or be based thereon, in particular, the signal value and/or the comparison value can each be and/or contain a value pattern.

For example, a characteristic value can be ascertained from the signal value or the signal value sequence. A group of preferred characteristic values will be illustrated hereafter on the basis of typical relationships. An arithmetic mean value can be a quotient of sum divided by number. A root mean square value (RMS) can be a square root of the quotient of the sum of the squares divided by number. A median value can be a mean value of a sorted series, for example, sorted by absolute value. A focal point frequency (spectral centroid) can be a weighted value, for example, weighted by absolute value and frequency. A frequency of the maximum can be a frequency having local or global maximum amplitude. This can comprise the location of the dominant excitation(s), which are filtered out. A spectral flatness (Wiener entropy) can be a quotient of the root mean square value and the arithmetic mean value. A tonality can be a measure of the dominance of individual frequencies, for example, a counterpart or reciprocal value of the spectral flatness. An inharmoniousness can be a measure of a frequency-related distribution irregularity. A variance can be a root mean square deviation of individual values of the signal from a mean value of the signal, and a standard deviation can be a square root of the variance. A computation of mel frequency cepstral coefficients (MFCC) can include, for example, the substeps calculating the absolute value, expressing as a logarithm, reduction, and decorrelation downstream of the filtering. A bulge (kurtosis) can be a fourth-order central moment as a statistical characteristic value. A skew (skewness) can be a third-order central moment as a statistical characteristic value. A variation breadth (peak2peak and/or span) can be a difference between extreme absolute values. A spectral flux can be a sum of individual products of absolute value and frequency. A loudness can be computed as described, for example, according to Zwicker in DIN 45631. A combination of at least a part of the above characteristic value determination methods can synergistically improve the efficiency and/or the reliability. The mentioned characteristic values have the advantage over most narrowband limit curve detectors of also making small spectral changes detectable. These advantages become important in particular if tonal noise components having large amplitudes also occur.

The comparison value for the characteristic value is preferably ascertained using the same characteristic value ascertainment method or methods. The comparison value can be a target value, which was ascertained by means of a formula or a manufacturer-side test. The comparison value can be an extrapolated value, in which at least a part of the respective preceding characteristic values are incorporated. Furthermore, a combination thereof is advantageous, for example, at the beginning of the life cycle of the machine. The characteristic value recognition is advantageous because unknown machine components can also be reliably monitored. It is thus possible with corresponding effort to know the precise type of every machine component, for example, every roller bearing, and to store its signal emission in the damage-free state and in the (preliminary) damaged state as references, and to monitor the time signals, frequencies, and/or order lines resulting therefrom, for example, a rollover frequency of a roller bearing; however, the automated recognition of a mere state change is more cost-effective.

A pattern recognition method, in this case preferably a machine and/or automated and/or algorithm-based learning (machine learning), can advantageously be used to detect changes only resulting from a combination of multiple features.

The recognition can include learning, in particular automatic learning, and/or be based thereon. In particular in the case of machines having individually greatly differing uses, such as machines of mobile hydraulics in different mobile machines which are individual by branch, learning can be reliable. For example, a learning phase, which can last up to 10 or up to 100 hours, for example, can be specifiable as defined as free of (preliminary) damage (good state). Additionally or alternatively, a maneuver list can be specifiable for the learning. Additionally or alternatively, at least one failure-free machine can be used as a reference machine for ascertaining and/or learning a recognition pattern. Both recognition based on learning and also recognition based on a reference machine and/or a combination thereof and/or therewith enable a simple and cost-effective startup which can be selected depending on the application.

The method according to the disclosure is preferably executed periodically to correspond reliably to a monitoring time pattern. In particular in the case of machines operated in a non-stationary manner, as is typical, for example, in mobile hydraulics, an event-controlled method execution or triggering can result in comparable framework conditions and a more finely graduated comparison result. Continuous monitoring can be achieved by overlapping method execution. At least parallel method execution can be advantageous, for example, for continuous detection and/or recognition.

The disclosure also relates to a program for executing an above-described method. In this case, the program can include the individual method steps both directly and also indirectly as a control program part.

The disclosure also comprises a device, which is configured to execute an above-described method or program. The device can also be configured in each case for the direct or controlling indirect execution of the individual method steps. The device can be a single unit, such as a sensor or a sensor control unit, a machine control unit, such as a burner control unit, a control unit subordinate to the monitored machine, such as an expansion of a burner control unit, or a superior control unit, such as a vehicle control unit superior to a burner control unit, or a central control unit, such as a server monitoring multiple machines, or the like and/or a combination thereof. The device can be an integrated device, such as a sensor having a sensor control unit, or a distributed device, such as at least one sensor and at least one control unit or a plurality of control units.

BRIEF DESCRIPTION OF THE DRAWINGS

Preferred exemplary embodiments of the disclosure are explained in greater detail hereafter on the basis of schematic drawings. In the figures:

FIG. 9 shows a method according to the disclosure in a flow chart.

DETAILED DESCRIPTION

In the embodiment, the method according to the disclosure has the steps S1 to S6 shown in FIG. 9. After a start of a method pass, in S1, a signal is detected, wherein in a substep S1a, the signal is recorded, for example, using a structure-borne sound sensor on a hydrostatic pump, and is A/D converted in a substep S1b. At the same time, in a step S2, for example, a speed sensor signal of an output shaft of the pump is detected via a CAN bus. The signal from S1 is transformed in S3 in a frequency range by means of a fast Fourier transform.

Spectra resulting in S3 are shown as amplitudes A over the frequencies f, for example, in FIGS. 1, 2, 5, and 7a.

Subsequently, in S4, the frequencies of dominant excitations to be filtered out are determined by means of the speed signal from S2 using known design variables, such as the number of the displacers of the pump, and these dominant excitations are filtered out.

Figure 1:
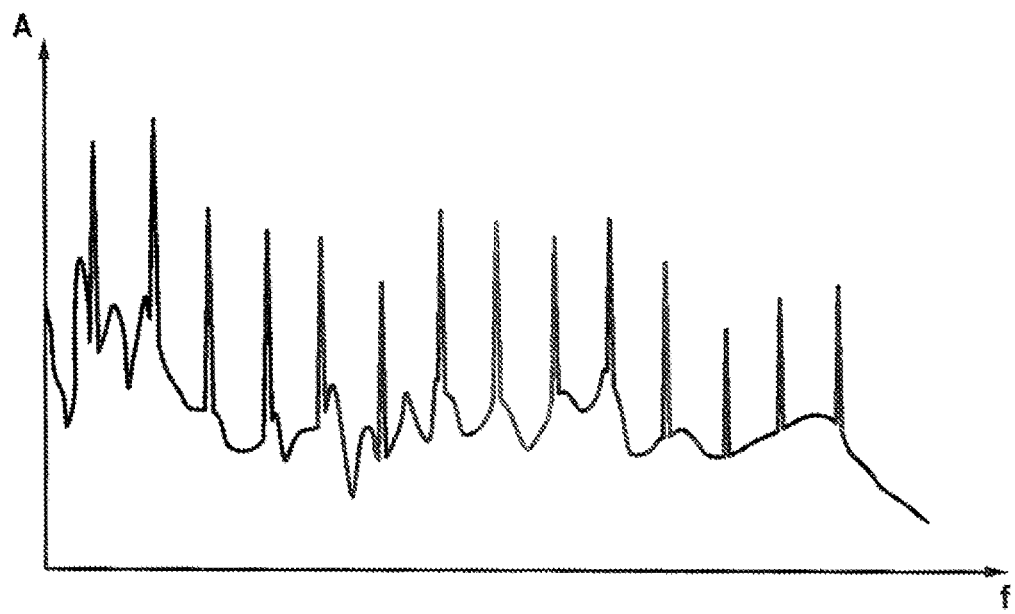
FIG. 1 shows a frequency spectrum having dominant excitations.
Figure 2:
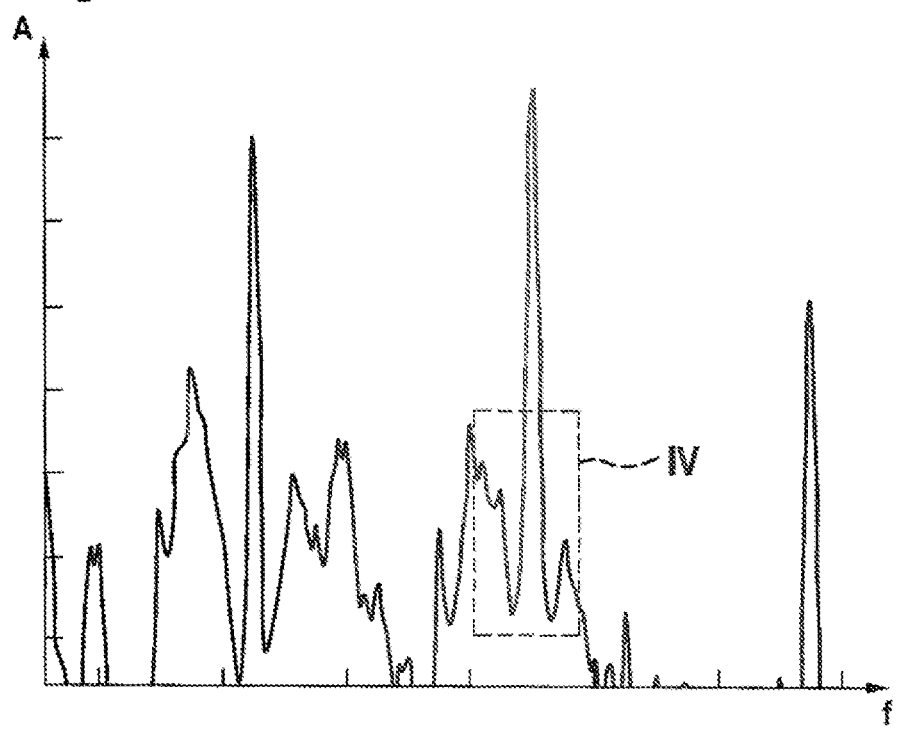
FIG. 2 shows a frequency spectrum having dominant excitations in an enlargement.
Figure 3:
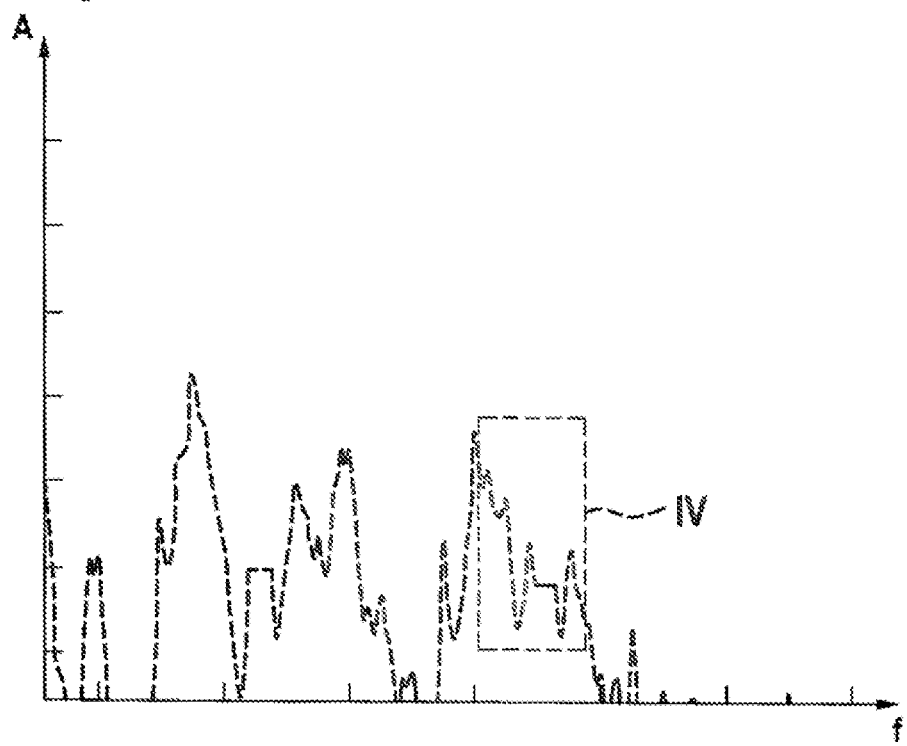
FIG. 3 shows the frequency spectrum of FIG. 2, wherein the dominant excitations are filtered out.
Figure 4:
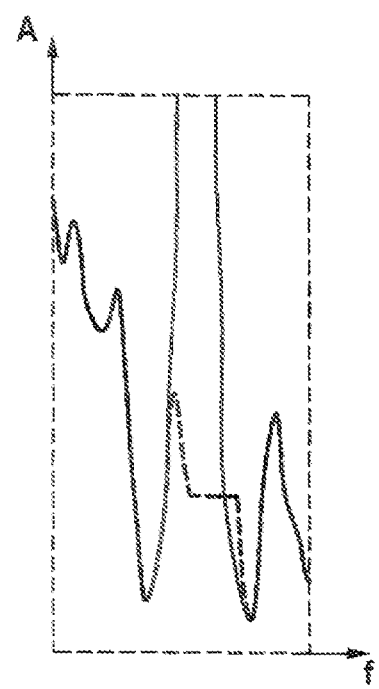
FIG. 4 shows a comparison of a region marked by IV in FIGS. 2 and 3.
Figure 5:
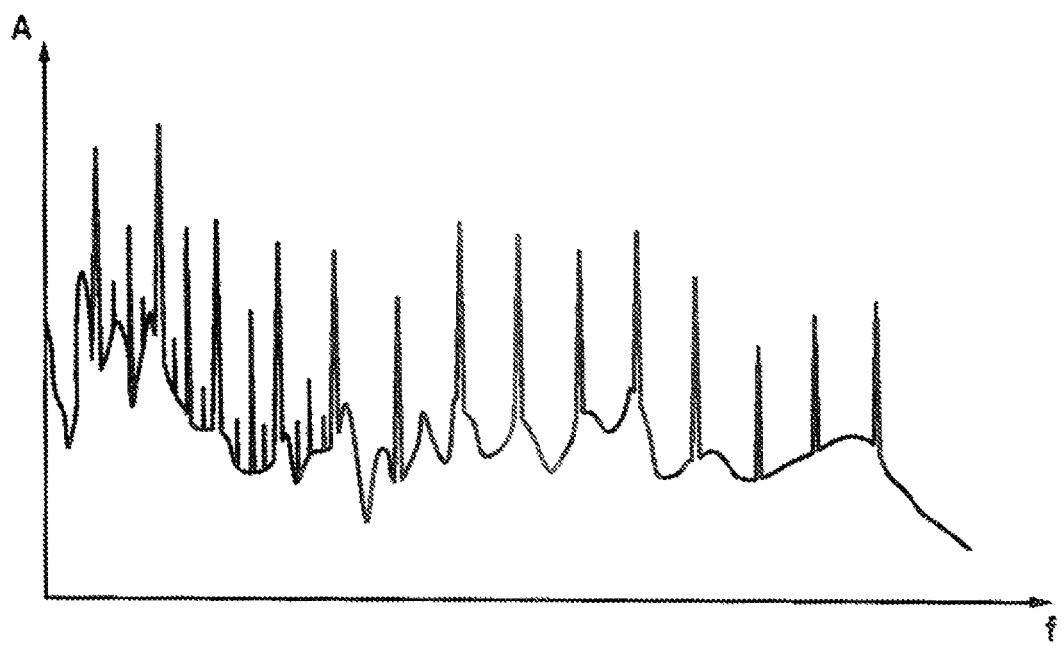
FIG. 5 shows a frequency spectrum having dominant excitations and additional excitations in relation to the frequency spectrum of FIG. 1.
Figure 6:
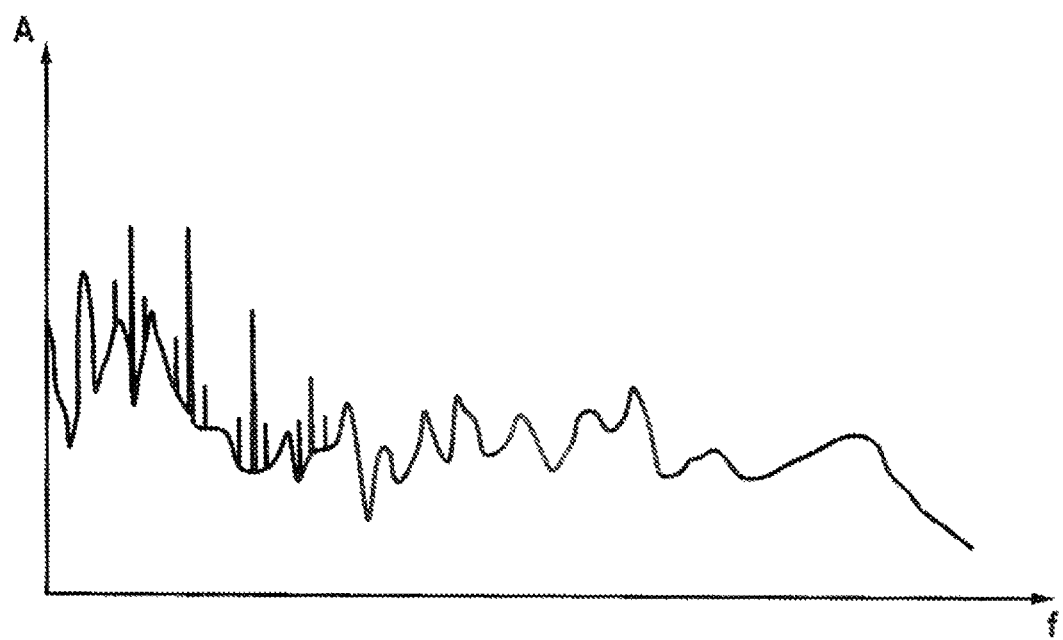
FIG. 6 shows the frequency spectrum of FIG. 5 without the dominant excitations.

Spectra resulting in S4 are shown, for example, in FIGS. 3, 6, and 7d. FIG. 4 shows a detail comparison between the results of the steps of FIG. 2 and FIG. 3, wherein a dominant excitation was replaced by an arithmetic mean of the adjacent values for the sake of simplicity as a filter in the present case.

The filtered signal is subjected in S5, in substeps S5a to S5c, to damage recognition. In this case, in S5a, a comparison value, for example, a characteristic value set from root mean square values in portions and flatness values in portions, is loaded, in S5b, the corresponding signal value, for example, a characteristic value set formed by the same rules, is computed and compared to the comparison value, and in S5c, the newly formed characteristic value set is offset with the loaded comparison value to form a new comparison value and this value is stored.

For illustration, diagrams 7b and 7e show multiple root mean square values (RMS) formed via rising frequency range portions which become broader, wherein diagram 7b is based on the spectrum having dominant excitations of diagram 7a, and diagram 7e is based on the spectrum without these dominant excitations of diagram 7d. Furthermore, diagrams 7c and 7f show multiple flatness values formed via the rising frequency range portions which become broader, wherein again they are based on the spectrum of diagrams 7a or 7d, respectively.

If the comparison does not indicate (preliminary) damage, the method can be ended. If the comparison indicates (preliminary) damage, or if, for example, a result is always required, a corresponding analysis can be performed in S6, such as a message or a computation of a remaining lifetime or a more accurate (preliminary) damage analysis, before the method is ended.

Figure 7:
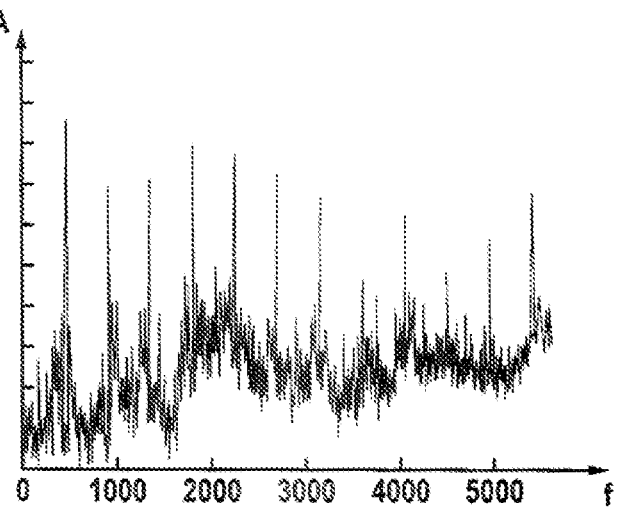
FIG. 7 shows, in a frequency range, the signal of FIGS. 1, 5 and 6, the spectrum in diagrams 7a and 7d, a root mean square value in portions in diagrams 7b and 7e, and a spectral flatness in portions in diagrams 7c and 7f, each compared with and without the dominant excitations.
Figure 7:
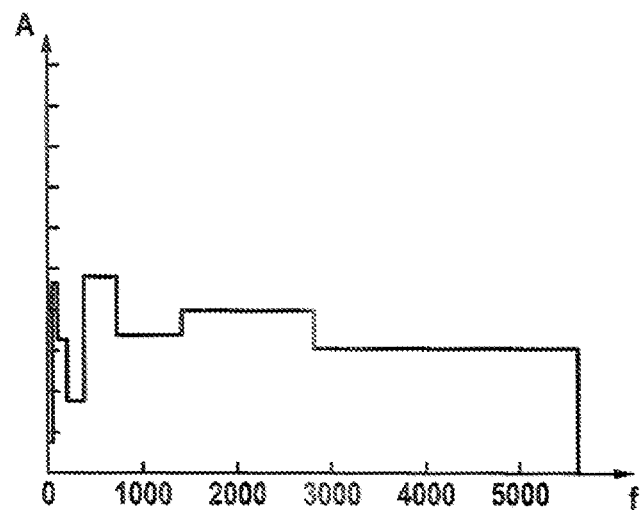
Figure 7:
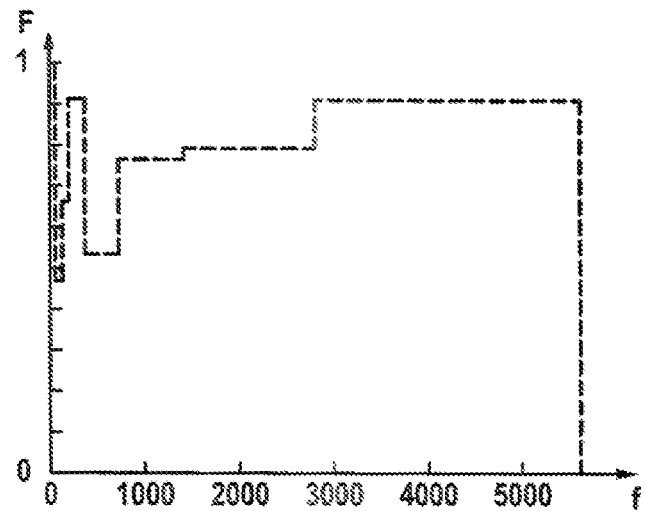
Figure 7:
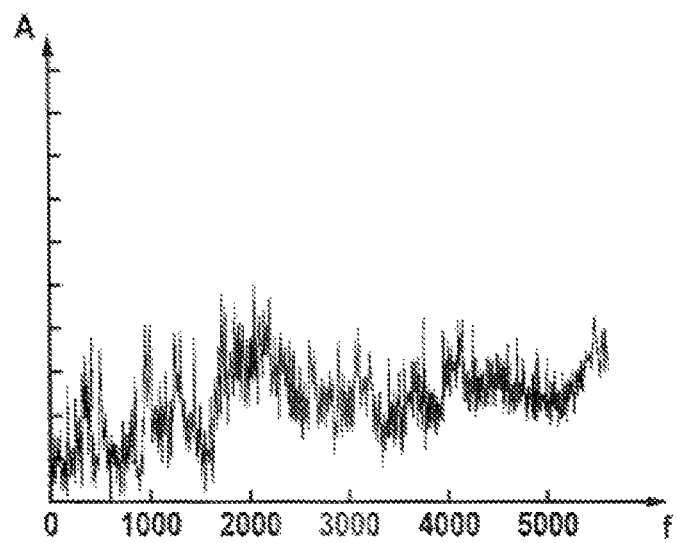
Figure 7:
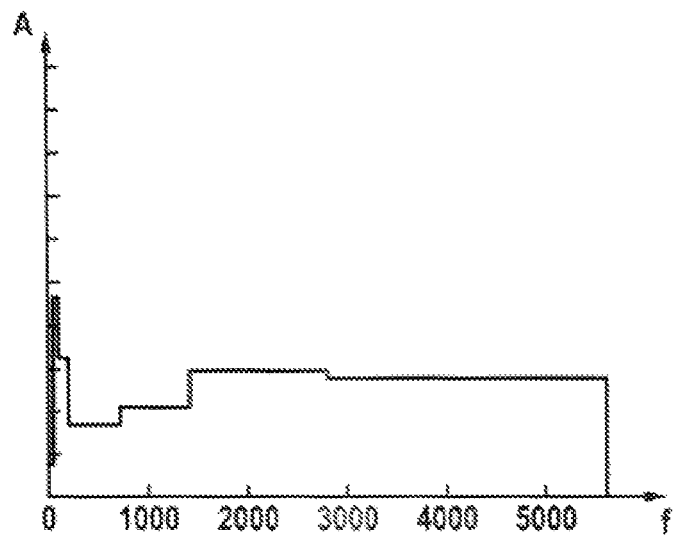
Figure 7:
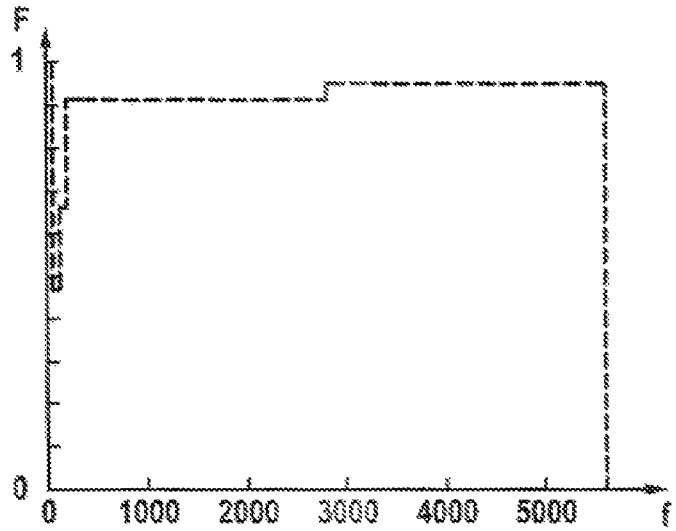
Figure 8:
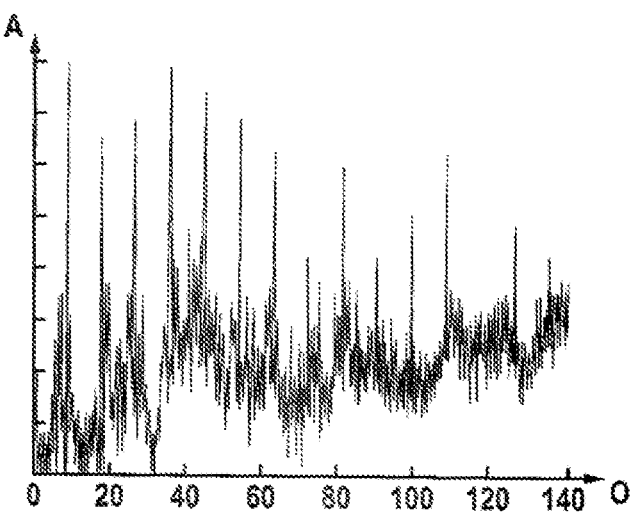
FIG. 8 shows, in an order range, the signal of FIGS. 1, 5, 6, and 7, the spectrum in diagrams 7a and 7d, a root mean square value in portions in diagrams 7b and 7e, and a spectral flatness in portions in diagrams 7c and 7f, each compared with and without the dominant excitations.
Figure 8:
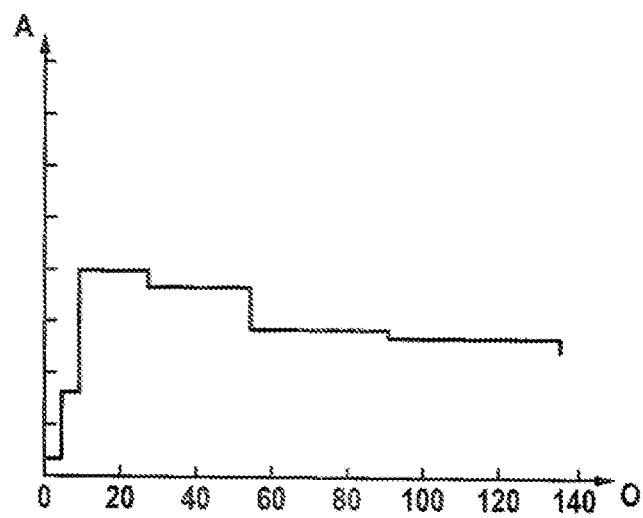
Figure 8:
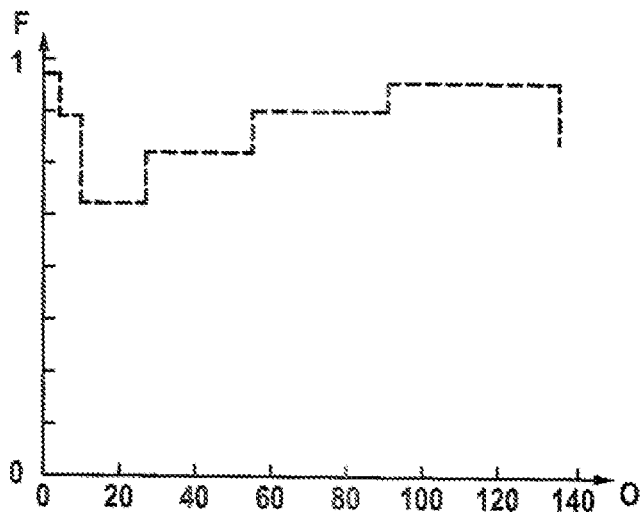
Figure 8:
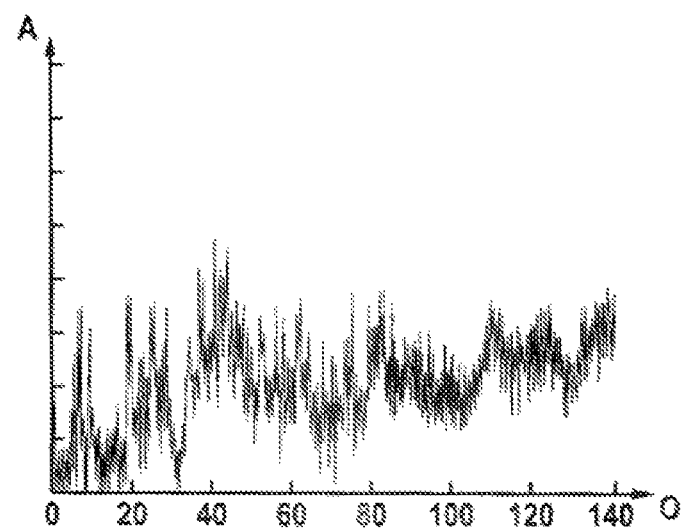
Figure 8:
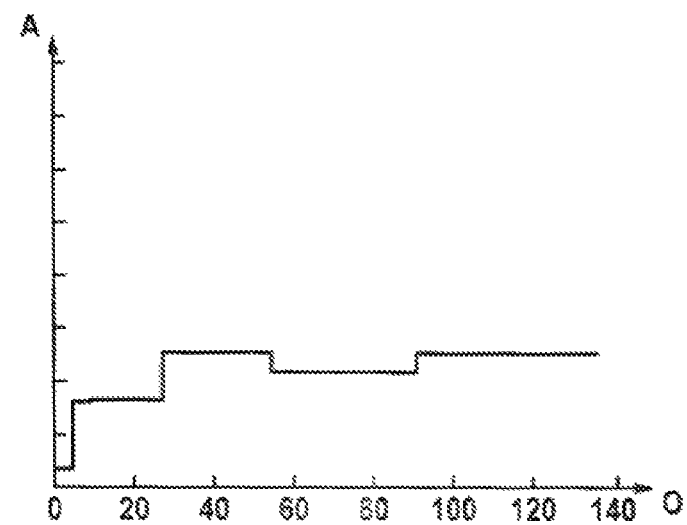
Figure 8:
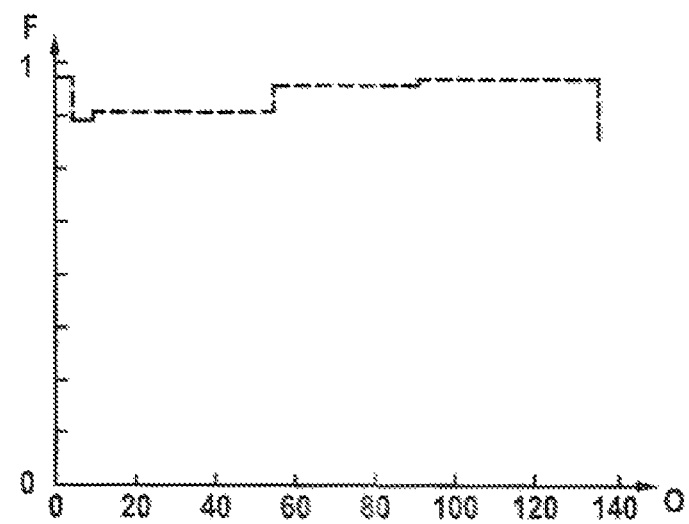

If, for example, to sharpen signals having slightly variable frequencies, order spectra are formed in an intermediate step (not shown) according to a modification of the embodiment, the illustrations of FIG. 8 result having the amplitudes A over the order 0 by way of example in place of the illustrations of FIG. 7.

According to one alternative (not shown), the recognition can be a pattern recognition based on a feature combination by means of machine learning. This includes, for example, tracking of a change or a trend including, for example, the substeps: loading a prior comparison value (historic value and/or history), computing a new value or pattern, determining a deviation, and comparing the computed deviation to the historic deviation or historic values and/or initial values. A state change recognizable in this case can be noted for this purpose from a change of a trend.

A method is thus disclosed for early damage recognition, wherein a frequency-transformed signal, filtered of dominant excitations, is supplied to a comparative early damage recognition.

LIST OF REFERENCE SIGNS

S1 . . . S6 steps
f frequency

A amplitude
O order

What is claimed is:

1. A method for early damage recognition of a machine, the method comprising:
    detecting at least one oscillation signal of the machine;
    transforming, after the detecting, the at least one oscillation signal from a time range into an image range;
    filtering, after the transforming, the at least one oscillation signal to reduce, at least in absolute value, at least one dominant excitation, the at least one dominant excitation being determined according to at least one operating variable;
    identifying at least one signal value from the at least one filtered oscillation signal, the at least one signal value being indicative of a signal emission of at least one component of the machine; and
    recognizing, after the filtering, damage of the machine by comparing the at least one signal value of the at least one oscillation signal to a comparison value, the comparison value corresponding to the signal emission of the at least one component of the machine in one of a damaged and damage-free state,
    wherein the comparison value is at least one of a predetermined target value, an extrapolated value, and a combination thereof.

2. The method according to claim 1, wherein the at least one oscillation signal of the machine is at least one of a pivot angle, a fluid-borne sound, an airborne sound, a structure-borne sound, and a combination thereof.

3. The method according to claim 1, the transforming further comprising:
    integrally transforming the at least one oscillation signal.

4. The method according to claim 3, the transforming further comprising:
    Fourier transforming the at least one oscillation signal.

5. The method according to claim 4, the transforming further comprising:
    discrete Fourier transforming the at least one oscillation signal.

6. The method according to claim 4, the transforming further comprising:
    fast Fourier transforming the at least one oscillation signal.

7. The method according to claim 1 further comprising:
    detecting, before the filtering, the at least one operating variable, the detecting of at least one operating variable being performed one of (i) once, (ii) irregularly, (iii) periodically, and (iv) continuously.

8. The method according to claim 1 further comprising:
    scaling, after the transforming, a spectrum into an order spectrum based on the at least one dominant excitation.

9. The method according to claim 1 further comprising:
    further filtering the at least one oscillation signal,
    wherein the further filtering is at least one of (i) after the filtering, (ii) integrated into the filtering, (iii) before the filtering, (iv) before the transforming, and (v) before the detecting.

10. The method according to claim 9 further comprising:
    outputting an envelope curve by rectifying the at least one oscillation signal, wherein the outputting is at least one of (i) after the filtering, (ii) after the further filter, (iii) integrated into the filtering, (iv) integrated into the further filtering, (v) before the filtering, (vi) before the further filtering, (vii) before the transforming, and (viii) before the detecting.

11. The method according to claim 1, furthermore comprising:
    allocating, before the recognizing, the at least one oscillation signal into at least two bands.

12. The method according to claim 1, wherein:
    at least one characteristic value, based on the at least one signal value, is used for the comparing, and
    the at least one characteristic value is at least one of an arithmetic mean value, a root mean square value, a median value, a focal point frequency (spectral centroid), a frequency of the maximum (maximum amplitude, maximum sum of the amplitudes), a spectral flatness (quotient of the root mean square value and the arithmetic mean value, Wiener entropy), an inharmoniousness, a standard deviation, mel frequency cepstrum coefficients (MFCC), a variance, a kurtosis (bulge), a skew (skewness), a variation breadth, a loudness, a spectral flux, a tonality, a variation breadth (peak2peak and/or span), and a combination thereof.

13. The method according to claim 1, wherein the detecting, transforming, the filtering, and the recognizing are performed at least one of (i) periodically, (ii) in an event-controlled manner, (iii) overlapping, and (iv) at least partially in parallel.

14. A non-transitory computer program for early damage recognition of a machine, the computer program configured to, when executed:
    detect at least one oscillation signal of the machine;
    transform, after the detecting, the at least one oscillation signal from a time range into an image range;
    filter, after the transforming, the at least one oscillation signal to reduce, at least in absolute value, at least one dominant excitation, the at least one dominant excitation being determined according to at least one operating variable;
    identify at least one signal value from the at least one filtered oscillation signal, the at least one signal value being indicative of a signal emission of at least one component of the machine; and
    recognize, after the filtering, damage of the machine by comparing the at least one signal value of the at least one oscillation signal to a comparison value, the comparison value corresponding to the signal emission of the at least one component of the machine in one of a damaged and damage-free state,
    wherein the comparison value is at least one of a predetermined target value, an extrapolated value, and a combination thereof.

15. A control unit for early damage recognition of a machine, the control unit configured to execute a non-transitory computer program to:
    detect at least one oscillation signal of a machine;
    transform, after the detecting, the at least one oscillation signal from a time range into an image range;
    filter, after the transforming, the at least one oscillation signal to reduce, at least in absolute value, at least one dominant excitation, the at least one dominant excitation being determined according to at least one operating variable;
    identify at least one signal value from the at least one filtered oscillation signal, the at least one signal value being indicative of a signal emission of at least one component of the machine; and
    recognize, after the filtering, damage of the machine by comparing the at least one signal value of the at least one oscillation signal to a comparison value, the comparison value corresponding to the signal emission of the at least one component of the machine in one of a damaged and damage-free state, wherein the comparison value is at least one of a predetermined target value, an extrapolated value, and a combination thereof.

\* \* \* \* \*